Patented Oct. 2, 1923.

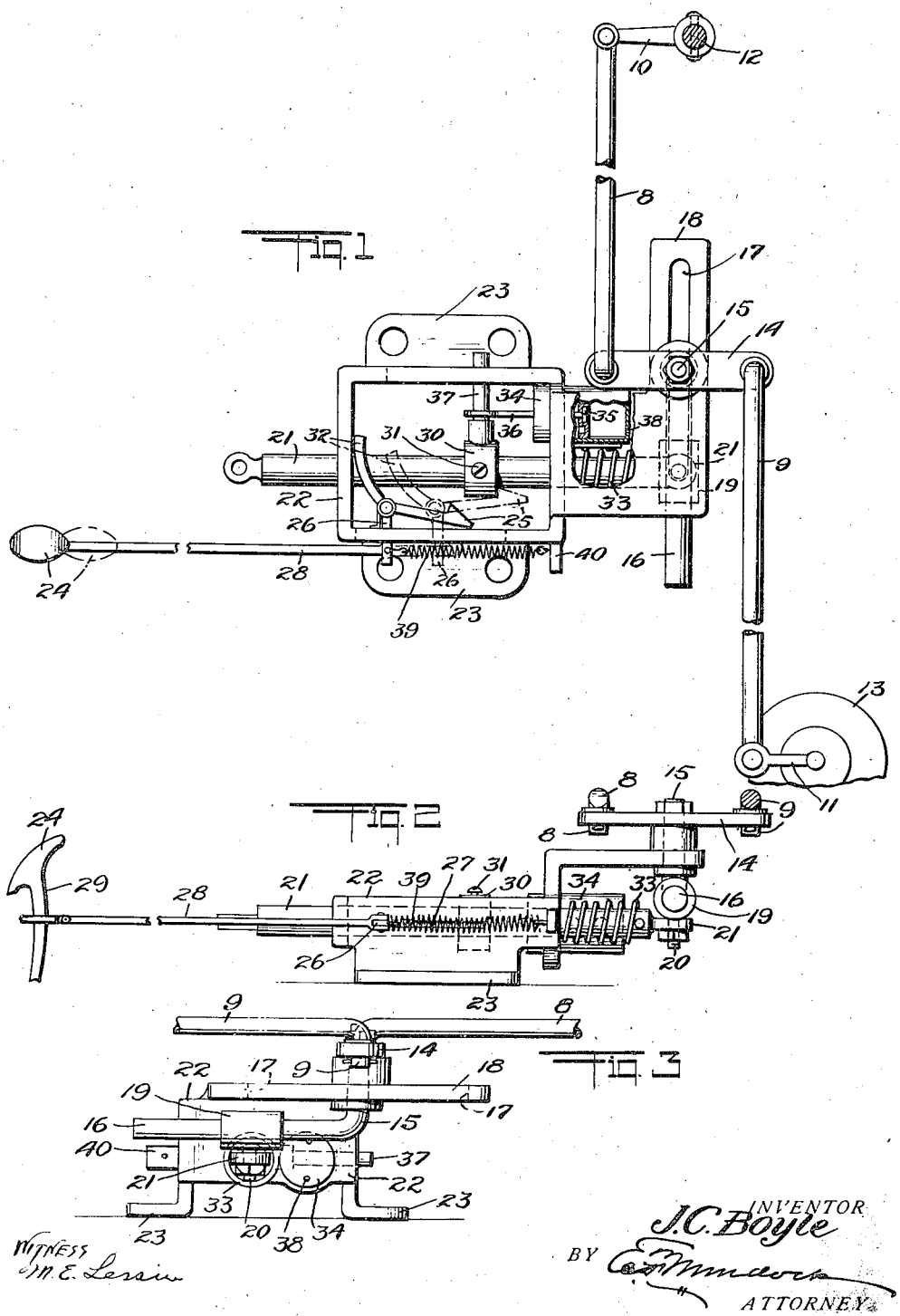

1,469,580

UNITED STATES PATENT OFFICE.

JAMES C. BOYLE, OF FLINT, MICHIGAN.

AUTOMOBILE GEAR-SHIFT CONTROL.

Application filed June 2, 1921. Serial No. 474,325.

*To all whom it may concern:*

Be it known that I, JAMES C. BOYLE, a citizen of the United States, and a resident of Flint, in the county of Genesee and State of Michigan, have invented certain new and useful Improvements in Automobile Gear-Shift Controls, of which the following is a full, clear, and exact description.

Among the principal objects which the present invention has in view are: to avoid damage and wear incident to the transition from one speed to another in the driving mechanism of an automobile; to correct imperfect operation of the gear shift controls of an automotive vehicle; to synchronize the speed of the prime mover with the operation of the gear shift controls; to prolong the usefulness of the vehicle; and to simplify and cheapen the construction of the control.

Drawings.

Figure 1 is a top plan view of an apparatus constructed and arranged in accordance with the present invention.

Figure 2 is a side view thereof.

Figure 3 is an end view thereof.

Description.

While the present construction may be employed in conjunction with automobiles of any known type, it is peculiarly adapted for use in conjunction with and upon automobiles of the so-called "Ford type," or of types employing planetary gear system and speed controls therefor. A peculiarity in the operation of this type of gear control consists in that the low speed lever is operated in advance of the operation of the high speed mechanism, the release of the lever inaugurating the low speed mechanism resulting in the introduction of the high speed mechanism without other transition. Usually, the supply of the fuel is maintained equally in both speeds resulting in the transition being effected without correspondence in the speed of the prime mover. It is this fault, particularly, that the present invention is designed to overcome.

With this end in view the mechanism shown in the accompanying drawings employs an articulated throttle-connecting rod having the members 8 and 9 pivotally connected with the rocking arm 10 and the throttle lever 11, respectively. The rocking arm 10 is pivotally mounted in the usual manner on one of the control rods 12 of a steering post, not shown. The operation of the carburetor 13 and controls therefor is that of the usual type.

The members 8 and 9 are pivotally connected by a swinging bar 14 which is mounted rigidly on the upturned end 15 of the guide bar 16.

The bar 16 is normally controlled by the co-operation of the slot 17 in the bracket 18 and the sleeve 19 pivotally mounted by the pin 20 at the end of the reciprocating bar 21. The bar 21 is slidably mounted in the perforations formed in the rectangular frame 22, which is bolted by means of the bolting flanges 23 provided therefor in any convenient situation on the frame of the motor and preferably in line with the low speed pedal 24 with which it is designed to co-operate.

It is obvious that when the arm 10 is shifted by the operation of either the foot accelerator or of the throttle lever on the steering post controls, the guide bar 16 being held by the sleeve 19 in line, the throttle lever 11 is rocked as if the connecting rod was solid, for the reason that the rocker 14 is prevented by the bar 16 and the sleeve 19 from rocking. If, however, the fuel supply controls are maintained and the arm 10 is held stationary while the bar 21 is retracted, the rocker 14 would be rotated on the downturned end of the member 8 with the result that the member 9 would be advanced or retracted to rock the lever 11 to increase or diminish the throttle opening in the carburetor. This is accomplished by means of the latch 25.

The latch 25 is pivotally mounted on the bracket 26. The bracket 26 is slidably mounted in a slot 27 in the side of the frame 22 to extend therethrough for attachment to a connecting rod 28 which operatively connects the said bracket and the neck 29 of the pedal 24, as seen best in Fig. 2 of the drawings. Normally the returned spring with which the pedal 24 is provided operating through the rod 28 holds the latch in the position shown in Fig. 1 of the drawings, and when said pedal is in its normal or inactive position.

When the pedal 24 is thrust forward to its position shown by the dotted lines in Fig. 1 of the drawings, the head of the latch 25 is carried forward to the position shown by dotted lines in the said figure, in which position it engages the said collar 30. The collar 30 is held in permanent position by the guide bar 21.

When now the pedal 24 and parts connected therewith are released the retractive spring of the pedal 24 operates to retract the bar 21, which being pivotally connected with the sleeve 19 draws it backward to swing the guide rod 16 and the rocker 14 rigidly connected therewith, on the downturned end of the member 8 with the result that the throttle lever 11 is operated to cut off the supply of explosive fuel passing to the engine with the concomitant that the engine speed is proportionately reduced. This permits the transition gear shift to be effected without shock to the machinery.

The latch 25 has a tail bar 32 which in the retracted position of the latch strikes on the side of the frame 22 to rock the latch 25 out of engagement with the collar 30 to permit the spring 33 to advance the guide bar 21, sleeve 19 and parts connected thereto, to the normal position with the result that the rocker 14, member 9, throttle lever 11, are returned to the position from which they were previously moved, resulting in the reestablishment of the fuel supply to the previous operated position.

It is to quiet the operation of the spring 33 and to prevent the too sudden operation of the parts connected with the carburetor 13 that I provide a dashpot 34, the piston 35 of which is operatively connected by the rod 36 to a laterally extended pin 37. The pin 37 serves the double purpose of operatively engaging the rod 36 and piston 35, and of preventing the rotation of the guide rod 21. To this end the said pin extends through a slot provided in the adjacent side of the frame 22.

The dashpot 34 may be of any of the usual constructions being preferably air-cushioned and having the escape port 38 formed in the end thereof. The usual pump valve type of piston 35 is employed to permit the easy intake of the air to the dashpot. The dashpot 34 is rigidly mounted in the frame 22.

While I have herein shown and described the use of a connecting rod 28, it will be understood that a flexible member such as a cable could be employed for connecting the pedal 24 and the bracket 26. When such construction is adopted I find it convenient to employ a pull spring 39, the one end whereof is anchored on the bracket 40. Also it will be understood that devices and mechanisms other than the spring 33 may be employed for returning the guide bar 21 and parts connected therewith to the normal condition such as an air gun or cylinder.

Having installed in operative relation to an automobile of the character mentioned an apparatus such as is herein shown and described, the operation is as follows.

The driver in starting the automobile opens the throttle valve of his carburetor to save operating speed. This having been established, he next thrusts forward the pedal 24 with the result that the driving gears are placed in what is known as low speed condition. Coincident therewith the latch 25 is moved forward to automatically engage the collar 30. When now the operator being prepared to shift his gears to high speed releases the pedal 24 the pedal is retracted drawing back the bracket 26, latch 25, collar 30, draw bar 21, sleeve 19, spring rocker 14 and member 9 so that the throttle lever 11 is moved to shut down the gas supply with the result that the engine is slowed to a point where the transition from low speed to high speed occurs without shock, jar or injury to the parts connected therewith, but as the pedal 24 and parts connected therewith are brought to their normal inactive position by the retracted spring connected therewith, the tail bar 32 engages the side of the frame 22 to throw the latch 25 from engagement with the collar 30, when immediately the spring 33 operates to restore the parts connected therewith to the normal or full gas supply position of the carburetor 13. This last operation is, however, controlled by means of the dashpot 34 so that the return of the carburetor to its said supply is occasioned without thinning of the mixture.

*Claims.*

1. In an automotive vehicle, a propelling engine, a carbureter for supplying fuel to said engine, a carrying mechanism for the vehicle, a speed gear shifting mechanism, a throttling mechanism for said carbureter, means connecting said throttling mechanism to said speed gear shifting mechanism whereby to regulate said carbureter for varying the speed of said engine correspondingly with the operative movements of the speed gear shifting mechanism, means for automatically readjusting said throttling mechanism and carbureter to normally predetermined position of operation coincidently with the completion of an operative movement of said gear shifting mechanism, and means operatively connected to said last mentioned means for retarding the action thereof during the readjustment of said throttling mechanism.

2. In an automotive vehicle having a carbureter; a propelling engine operatively connected therewith, and speed gear shift mechanism connecting said engine with the carrying mechanism of said vehicle; a throttle operating mechanism for said carbureter comprising an articulated throttle rod operatively connected by a rocking member; means operatively connecting said rocking member and the speed gear shifting mechanism for rocking said rocking member coincidently with the release of the latter; means for automatically readjusting said rocking member to its manually adjusted position coincidently with the engagement of said gear shifting mechanism, said means embodying a spring for normally holding said rocking member in fixed relation to said connecting rod; and means operatively connected with said spring for slowing the action thereof when readjusting said rocking member.

3. In a device of the class described, a carbureter, manually actuated rocking connections for said carbureter, an intermediate rocking connection cooperative with said first mentioned rocking connections and normally inoperative during the usual actuation thereof, a speed gear shifting mechanism, means operable with said speed gear shifting mechanism for actuating said intermediate rocking connection and said first mentioned rocking connections therewith to reduce the fuel output of said carbureter during the speed changing movements of the speed gear shifting mechanism, and means for returning said rocking connections to normally set position simultaneously with the final movements of said speed gear shifting mechanism to the selected operative position thereof.

4. In a device of the class described, a carbureter, manually acuated rocking connections for said carbureter, an intermediate rocking connection cooperative with said first mentioned rocking connections and normally inoperative during the usual actuation thereof, a speed gear shifting mechanism, means operable with said speed gear shifting mechanism for actuating said intermediate rocking connection and said first mentioned rocking connections therewith to reduce the fuel output of said carbureter during the speed changing movements of the speed gear shifting mechanism, and automatic means for returning said rocking connections to normally set position simultaneously with the final movements of said speed gear shifting mechanism to the selected operative position thereof.

5. In a device of the class described, a carbureter, manually actuated rocking connections for said carbureter, an intermediate rocking connection cooperative with said first mentioned rocking connections and normally inoperative during the usual actuation thereof, a speed gear shifting mechanism, means operable with said speed gear shifting mechanism for actuating said intermediate rocking connection and said first mentioned rocking connections therewith to reduce the fuel output of said carbureter during the speed changing movements of the speed gear shifting mechanism, latching means carried by said speed gear shifting mechanism for establishng operative connections between the same and said first mentioned means during the initial speed changing movements thereof, means for actuating said latching means to released position simultaneously with the final movement of said speed gear shifting mechanism to the selected operative position thereof, and automatic means for returning said rocking connections and the carbureter to normally set position simultaneously with the release of said latching means.

JAMES C. BOYLE.